(12) United States Patent
Inoue (10) Patent No.: US 10,372,634 B2
(45) Date of Patent: Aug. 6, 2019

(54) CONNECTION DEVICE AND METHOD OF CHANGING OPERATION CONTENT OF CONNECTION DEVICE

(71) Applicant: SUMITOMO ELECTRIC INDUSTRIES, LTD., Osaka-shi, Osaka (JP)

(72) Inventor: Takeshi Inoue, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/787,780

(22) Filed: Oct. 19, 2017

(65) Prior Publication Data
US 2018/0121374 A1  May 3, 2018

(30) Foreign Application Priority Data
Oct. 31, 2016 (JP) .................. 2016-213454

(51) Int. Cl.
*H01R 4/02* (2006.01)
*H01R 12/72* (2011.01)
*G06F 13/16* (2006.01)
*G06F 13/38* (2006.01)

(52) U.S. Cl.
CPC .......... *G06F 13/16* (2013.01); *G06F 13/385* (2013.01); *H01R 4/023* (2013.01); *H01R 12/721* (2013.01)

(58) Field of Classification Search
CPC .......... G06F 13/385; G06F 2213/0042; H01R 4/023; H01R 12/721
See application file for complete search history.

(56) References Cited

U.S. PATENT DOCUMENTS

| | | | | |
|---|---|---|---|---|
| 6,978,319 B1* | 12/2005 | Rostoker | ............... | G06F 9/4411 709/250 |
| 8,907,221 B1* | 12/2014 | Mohanty | .............. | H01R 31/065 174/117 F |
| 2009/0061678 A1* | 3/2009 | Minoo | ................... | H01R 29/00 439/502 |
| 2011/0028038 A1* | 2/2011 | Luo | ........................ | H01R 12/62 439/607.58 |

(Continued)

FOREIGN PATENT DOCUMENTS

| JP | 2011-513883 A | 4/2011 |
|---|---|---|
| JP | 2015-174377 A | 10/2015 |
| WO | WO-2010/002660 A2 | 1/2010 |

*Primary Examiner* — Glenn A. Auve
(74) *Attorney, Agent, or Firm* — Drinker Biddle & Reath LLP (57) ABSTRACT

In an exemplary embodiment, a connection device includes a cable unit, first and second connector units, and a circuit board. The first connector unit is provided at a first end of the cable unit and is connectable to a host device. The second connector unit is provided at a second end of the cable unit and is connectable to a terminal device. The circuit board includes a control unit and is provided in one of the first and second connector units. The control unit includes a storage unit and a management unit. The storage unit stores operation data indicating operation content of the connection device. The management unit manages the operation data, and changes the operation data on the basis of instruction data received from the host device if the connection device is connected to the host device and the terminal device.

6 Claims, 7 Drawing Sheets

(56) References Cited

U.S. PATENT DOCUMENTS

| | | | |
|---|---|---|---|
| 2013/0227631 A1* | 8/2013 | Sharma | G06F 3/14 |
| | | | 725/127 |
| 2015/0347348 A1* | 12/2015 | Gouw | G06F 13/4221 |
| | | | 710/313 |
| 2016/0056588 A1* | 2/2016 | Motoichi | H01R 13/7137 |
| | | | 439/620.22 |
| 2016/0217093 A1* | 7/2016 | Whittington | H04L 12/462 |
| 2017/0108910 A1* | 4/2017 | Goh | G06F 1/266 |

* cited by examiner

CONNECTION DEVICE AND METHOD OF CHANGING OPERATION CONTENT OF CONNECTION DEVICE

This application is based on and claims priority from Japanese Patent Application No. 2016-213454 filed on Oct. 31, 2016, with the Japan Patent Office, the disclosures of which are incorporated herein in their entireties by reference.

TECHNICAL FIELD

The present disclosure relates to a connection device and a method of changing operation content of the connection device.

BACKGROUND

In Japanese Unexamined Patent Application Publication (Translation of PCT Application) No. 2011-513883, technology related to asymmetric universal serial bus communication is disclosed, and various USB standards (communication standards) having different communication speeds or the like are described. The universal serial bus cable described in Japanese Unexamined Patent Application Publication (Translation of PCT Application) No. 2011-513883 includes a first differential pair to transmit bus signals and a second differential pair to transmit bus signals in the same direction as the bus signals transmitted by the first differential pair, wherein a bandwidth of the universal serial bus cable is doubled in that same direction.

Also, in Japanese Unexamined Patent Application Publication No. 2015-174377, technology related to an image forming device, a method of controlling the image forming device, and a program is disclosed, and a USB standard in which a plurality of electric power supply profiles are set is described. The image forming device described in Japanese Unexamined Patent Application Publication No. 2015-174377 includes a USB_PD control unit configured to control electric power supply to a USB-connected external device on the basis of setting information of an electric power profile of USB_PD indicating an amount of electric power capable of being supplied to the external device by USB_PD. Then, when the image forming device transitions to a sleep state, the USB_PD control unit performs electric power supply negotiation with the external device using an electric power profile capable of being supplied in an electric power state after the transition, and changes an amount of electric power to be fed to the external device from a result of the electric power supply negotiation. If electric power is supplied by USB_PD, the image forming device, which is the electric power supply side, performs negotiation with the device of an electric power supply destination at the time of transition from a normal state to the sleep state.

SUMMARY

According to an aspect of the present disclosure, a connection device includes a cable unit; a first connector unit; a second connector unit; and a circuit board, wherein the first connector unit is provided at a first end of the cable unit and is connectable to a host device, wherein the second connector unit is provided at a second end of the cable unit and is connectable to a terminal device, wherein the circuit board includes a control unit and is provided in one of the first connector unit and the second connector unit, wherein the control unit includes a storage unit and a management unit, wherein the storage unit stores operation data indicating operation content of the connection device, wherein the management unit manages the operation data, and wherein the management unit changes the operation data on the basis of instruction data when the management unit receives the instruction data for issuing an instruction for changing the operation data from the host device if the connection device is connected to the host device via the first connector unit and the connection device is connected to the terminal device via the second connector unit.

DETAILED DESCRIPTION

In the following detailed description, reference is made to the accompanying drawings, which form a part hereof. The exemplary embodiments described in the detailed description, drawing, and claims are not meant to be limiting. Other exemplary embodiments may be utilized, and other changes may be made, without departing from the spirit or scope of the subject matter presented here.

A connection device is required for each of pieces of operation content because the connection device is selectively used in accordance with operation content of a communication standard and an electric power supply profile. Accordingly, this is inefficient because it is necessary to manufacture and selectively use a plurality of types of connection device. Also, an indication for identifying the operation content can be displayed on the connection device, but an amount of operation content to be identified may be large and the indication may not be able to be easily read by the user in some cases.

Description of Exemplary Embodiments of Present Disclosure

Exemplary embodiments of the present disclosure will be first listed and described. In a first aspect, there is provided a connection device including: a cable unit; a first connector unit; a second connector unit; and a circuit board, wherein the first connector unit is provided at a first end of the cable unit and is connectable to a host device, wherein the second connector unit is provided at a second end of the cable unit and is connectable to a terminal device, wherein the circuit board includes a control unit and is provided in one of the first connector unit and the second connector unit, wherein the control unit includes a storage unit and a management unit, wherein the storage unit stores operation data indicating operation content of the connection device, wherein the management unit manages the operation data, and wherein the management unit changes the operation data on the basis of instruction data when the management unit receives the instruction data for issuing an instruction for changing the operation data from the host device if the connection device is connected to the host device via the first connector unit and the connection device is connected to the terminal device via the second connector unit. As described above, the operation data indicating the operation content of the connection device is stored in the storage unit of the connection device and the operation data can be changed by the management unit of the connection device if the instruction data for issuing an instruction for changing the operation data is transmitted from the host device. Accordingly, an operation with a plurality of pieces of operation content is enabled in one connection device.

In an exemplary embodiment, the connection device further includes: one or more communication lines; and one or more electric power supply lines, wherein the operation data has data indicating a communication standard and data indicating an electric power supply standard, wherein the communication standard defines a communication speed in the one or more communication lines, wherein the electric power supply standard defines a voltage value and an electric current value in the one or more electric power supply lines, and wherein, if the connection device is connected to the host device and the terminal device, communication via the one or more communication lines and electric power supply via the one or more electric power supply lines are implemented between the host device and the terminal device on the basis of the operation content indicated by the operation data. As described above, the operation data includes the data indicating the communication standard and the data indicating the electric power supply standard. Consequently, the operation content of the connection device can be defined by the communication standard and the electric power supply standard.

In an exemplary embodiment, the connection device further includes: a signal conditioner, wherein the signal conditioner is provided in the communication lines and communication via the communication lines is implemented in the communication standard shown in the operation data, and wherein the management unit instructs the signal conditioner to set the communication standard shown in the operation data. As described above, the communication standard of the connection device defined in the operation data can be implemented by the signal conditioner.

In an exemplary embodiment, the connection device further includes: a power conditioner, wherein the power conditioner is provided in the one or more electric power supply lines and electric power supply via the one or more electric power supply lines is implemented in the electric power supply standard shown in the operation data, and wherein the management unit instructs the power conditioner to set the electric power supply standard shown in the operation data. As described above, the electric power supply standard of the connection device defined in the operation data can be implemented by the power conditioner.

In an exemplary embodiment, the instruction data includes authentication data and change data, the authentication data is used for authentication of a change in the operation data, the change data indicates changed content of the operation data, the storage unit stores collation data, the collation data is used for collation of the authentication data, and, if the connection device is connected to the host device and the terminal device, the management unit collates the authentication data included in the instruction data with the collation data when the management unit receives the instruction data from the host device, and changes the operation data on the basis of content of change data included in the instruction data when the management unit confirms validity of the authentication indicated by the authentication data as a collation result. As described above, because the connection device collates the authentication data transmitted from the host device side with the collation data stored by the connection device and changes the operation data if validity of the authentication indicated by the authentication data can be confirmed, security can be improved in relation to a change in the operation data.

In another aspect there is provided a method of changing operation content of a connection device which connects a host device and a terminal device, the method including the steps of: detecting, by the host device, a connection between the connection device connected to the terminal device and the host device; requesting, by the host device, the connection device to provide the operation content of the connection device and requesting, by the host device, the terminal device to provide operation content of the terminal device; determining, by the host device, whether or not the operation content of the terminal device is superior to the operation content of the connection device; transmitting, by the host device, a query for permitting a change in operation data indicating the operation content of the connection device to a server device which manages a usage state of the connection device in order to adjust the operation content of the connection device to the operation content of the terminal device if the host device determines that the operation content of the terminal device is superior to the operation content of the connection device; transmitting, by the server device, authentication data used for authentication of a change in the operation data to the host device if the server device permits a change in the operation data of the connection device; transmitting, by the host device receiving the authentication data, the authentication data and change data indicating changed content of the operation data to the connection device; and changing the operation data on the basis of content of the change data after the connection device confirms validity of authentication indicated by the authentication data when the connection device receives the authentication data and the change data from the host device. As described above, the operation data indicating the operation content of the connection device is stored in the storage unit of the connection device and the operation data can be changed by the management unit of the connection device when the instruction data indicating a change in the operation data is transmitted from the host device. Accordingly, in one connection device, an operation with a plurality of pieces of operation content is enabled.

In an exemplary embodiment, the operation data has data indicating a communication standard and data indicating an electric power supply standard, the communication standard defines a communication speed in connection device, and the electric power supply standard defines a voltage value and an electric current value in the connection device. As described above, the operation data includes the data indicating the communication standard and the data indicating the electric power supply standard. Consequently, the operation content of the connection device can be defined by the communication standard and the electric power supply standard.

Details of Exemplary Embodiments of Present Disclosure

Specific examples of a connection device and a method of changing operation content of the connection device according to exemplary embodiments of the present disclosure will be described below with reference to the drawings. Also, the present disclosure is not limited to exemplary description thereof and the scope of the disclosure is, therefore, indicated by the appended claims. All changes, which come within the equivalent meaning and range of the claims, are to be embraced within their scope. In the description of the drawings, if possible, the same elements are denoted by the same reference signs and redundant description thereof will not be described.

Figure 1:
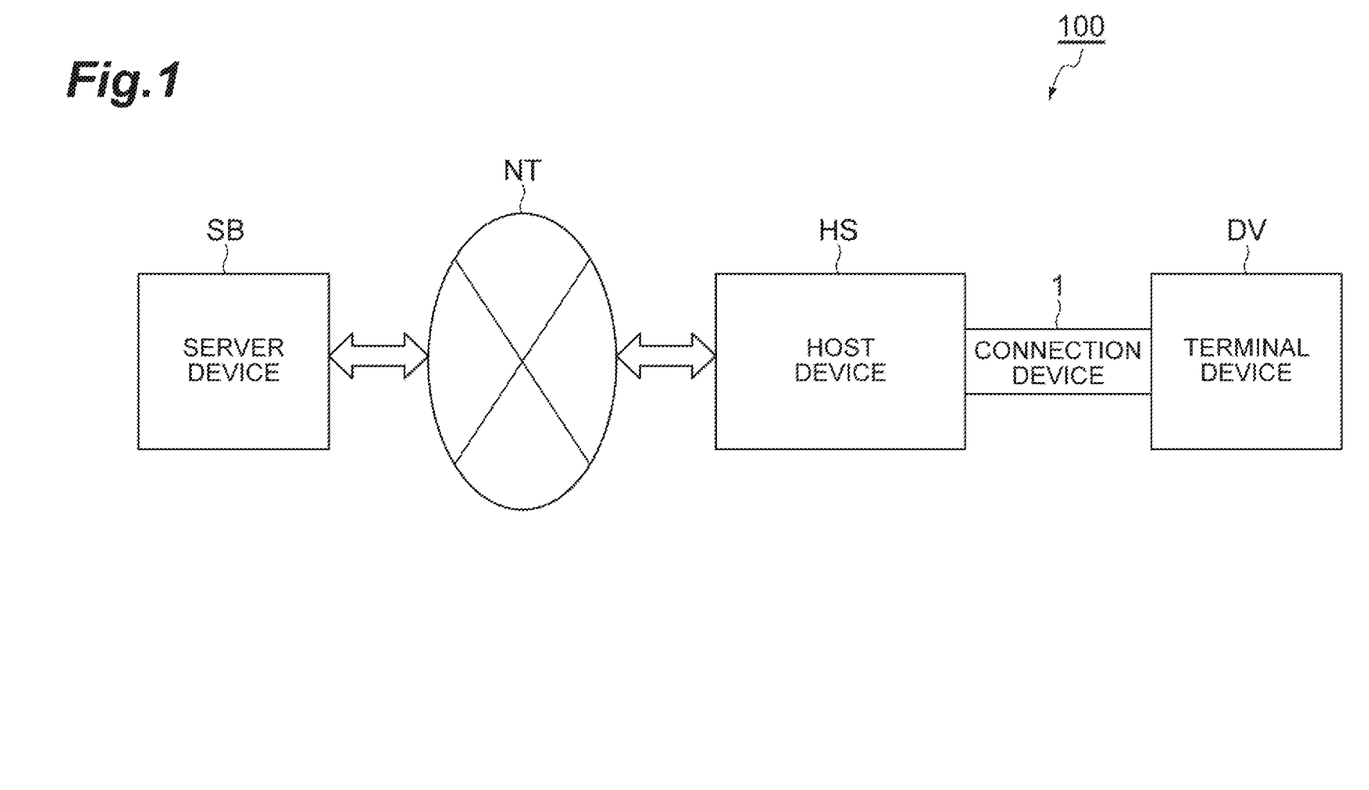
FIG. 1 is a diagram illustrating an example of a configuration of a communication system according to an exemplary embodiment.
Figure 2:
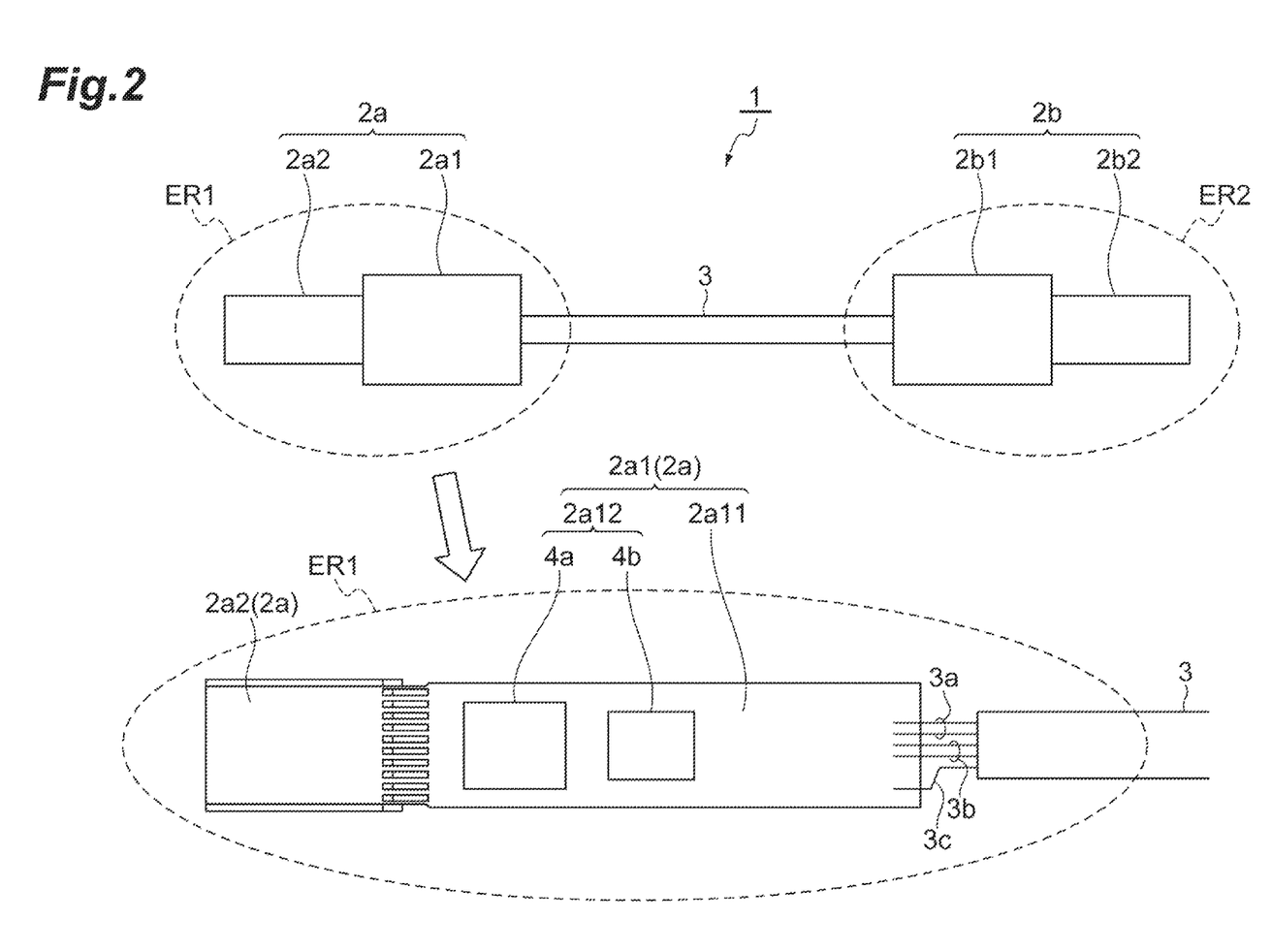
FIG. 2 is a diagram illustrating an example of a configuration of a connection device according to an exemplary embodiment.
Figure 3:
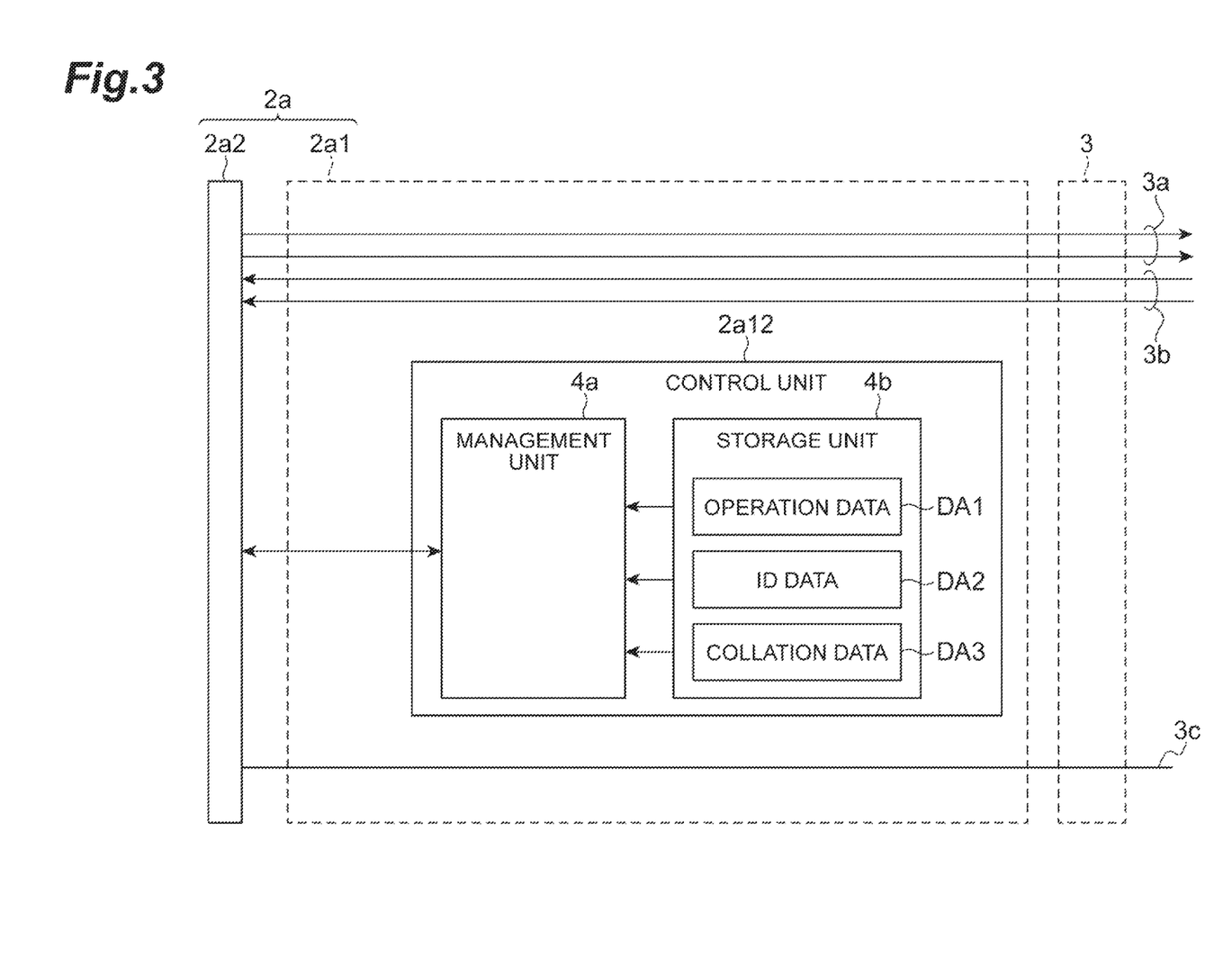
FIG. 3 is a diagram schematically illustrating an example of a configuration of a connector unit of the connection device according to an exemplary embodiment.
Figure 4:
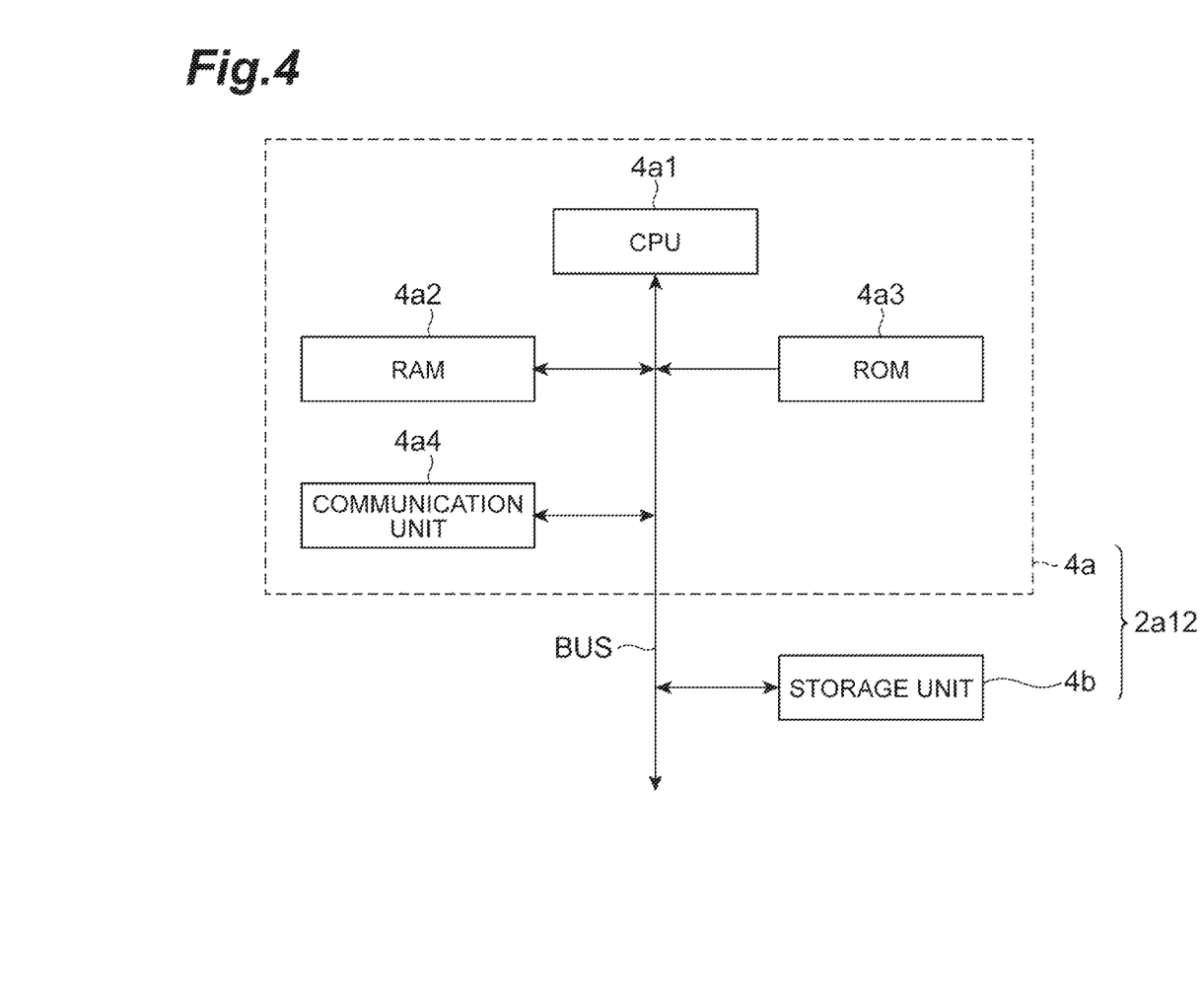
FIG. 4 is a diagram schematically illustrating an example of a configuration of a control unit of the connection device according to an exemplary embodiment.

A configuration of a connection device 1 according to the exemplary embodiment will be described with reference to FIGS. 1, 2, 3 and 4. FIG. 1 is a diagram illustrating an example of a configuration of a communication system according to an exemplary embodiment. FIG. 2 is a diagram illustrating an example of a configuration of a connection device according to an exemplary embodiment. FIG. 3 is a diagram schematically illustrating an example of a configuration of a connector unit of the connection device according to an exemplary embodiment. FIG. 4 is a diagram schematically illustrating an example of a configuration of a control unit of the connection device according to an exemplary embodiment. As illustrated in FIG. 1, the connection device 1 according to the exemplary embodiment is included in a communication system 100. The communication system 100 includes a terminal device DV, a host device HS, a communication network NT, and a server device SB together with the connection device 1.

The terminal device DV is, for example, a personal computer (PC), a hard disk device, a printer device, or the like. The connection device 1 connects the terminal device DV and the host device HS. A specific configuration of the connection device 1 will be described below. The host device HS is connected to the terminal device DV via the connection device 1. The host device HS is connected to the server device SB via the communication network NT. The host device HS is, for example, a personal computer (PC) or the like. The host device HS includes a computer program for managing the operation of the connection device 1 (a program for implementing a part performed by the host device HS in the sequence illustrated in FIG. 6). The communication network NT is a communication network including the Internet, a LAN line, a telephone line, and the like. The server device SB is a device that provides a service related to the connection device 1, and manages various types of unique data of the connection device 1 (including an ID of the connection device 1), a usage state of the connection device 1 (a device connected to the connection device 1 (including a previously connected device), a usage history of the connection device 1, and operation content of the connection device 1 at a current point in time), data about a user of the connection device 1 (including data related to a credit card), and the like.

As illustrated in FIGS. 2 and 3, the connection device 1 includes a connector unit 2a (a first connector unit), a cable unit 3, a connector unit 2b (a second connector unit), and a circuit board 2a11. The connector unit 2a can be connected to the host device HS. The connector unit 2a includes a main body 2a1 and a plug 2a2. The connector unit 2a is provided at an end ER1 (a first end) of the connection device 1. The main body 2a1 includes a circuit board 2a11 and a control unit 2a12. The control unit 2a12 is provided on the circuit board 2a11. The control unit 2a12 includes a management unit 4a and a storage unit 4b. The connector unit 2b can be connected to the terminal device DV. The connector unit 2b includes a main body 2b1 and a plug 2b2. The connector unit 2b is provided at an end ER2 (a second end) of the connection device 1.

The cable unit 3 includes two communication lines 3a, two communication lines 3b, and one electric power supply line 3c. The communication line 3a is a line for transmitting a signal from the connector unit 2a side to the connector unit 2b side. The communication line 3b is a line for transmitting a signal from the connector unit 2b side to the connector unit 2a side. Although the communication line 3a and the communication line 3b can be metallic lines, they can also be optical fibers. If the communication line 3a and the communication line 3b are optical fibers, a photoelectric conversion element including a light emitting element and a light receiving element is mounted on the circuit board 2a11. The electric power supply line 3c is a line for supplying electric power from the connector unit 2a side to the connector unit 2b side.

Figure 7:
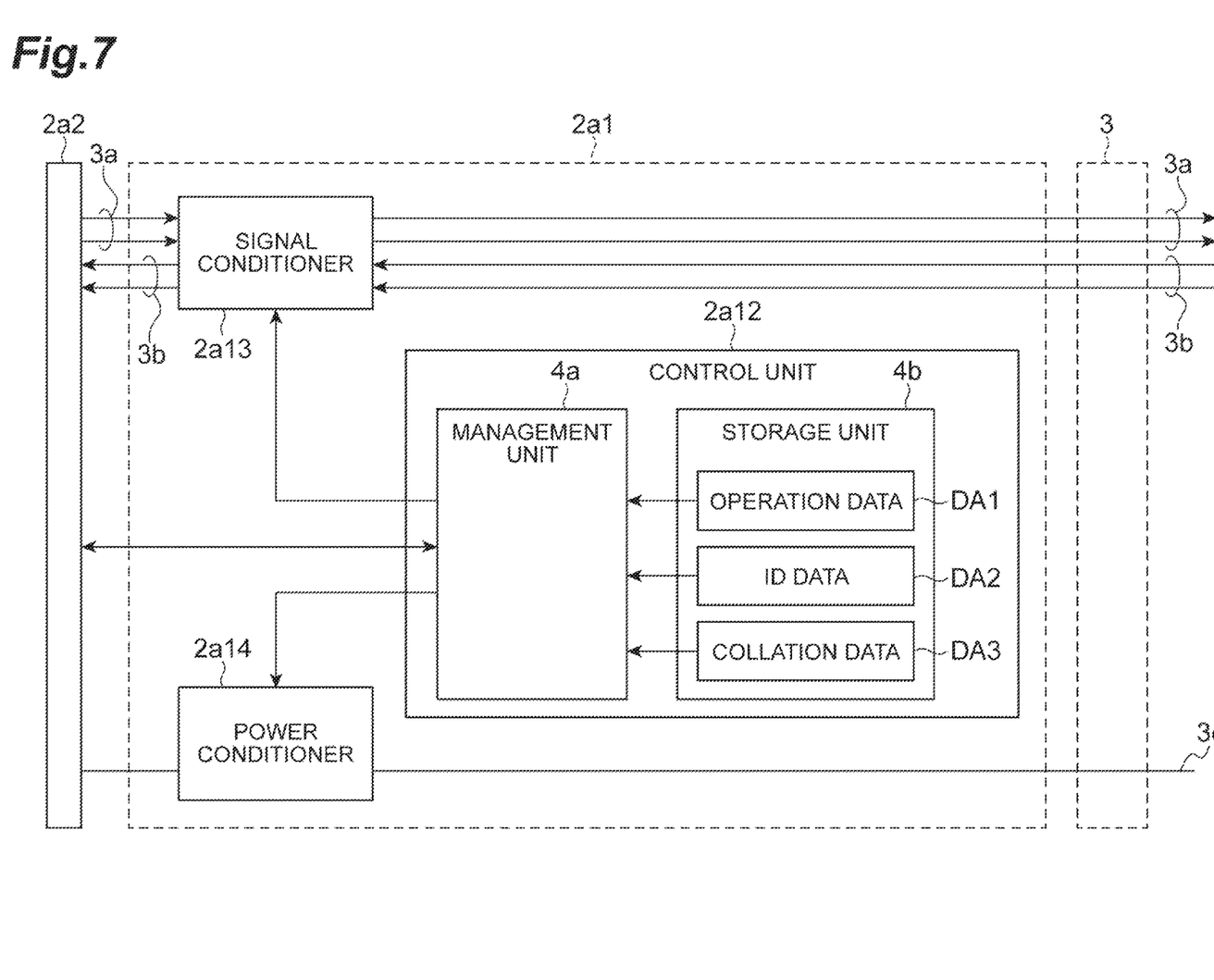
FIG. 7 is a diagram schematically illustrating another example of a configuration of the connector unit of the connection device according to an exemplary embodiment.

Although the circuit board 2a11 and the control unit 2a12 illustrated in FIGS. 2 and 3 are provided in the main body 2a1 of the connector unit 2a, the present disclosure is not limited thereto. The circuit board 2a11 and the control unit 2a12 may be provided in the main body 2b1 of the connector unit 2b and can further be provided in both the main body 2a1 of the connector unit 2a and the main body 2b1 of the connector unit 2b. Also, the communication line 3a is not limited to a case including two lines as illustrated in FIGS. 2, 3, and 7 and may include one line or three or more lines. The communication line 3b is not limited to a case including two lines as illustrated in FIGS. 2, 3, and 7, and may also include one line or three or more lines. The electric power supply line 3c is not limited to a case including one line as illustrated in FIGS. 2, 3, and 7, and may also include two or more lines. Also, the communication line may be, for example, only the communication line 3a between the communication line 3a and the communication line 3b if communication is performed only in the direction from the host device HS to the terminal device DV. The communication line may be, for example, only the communication line 3b between the communication line 3a and the communication line 3b if communication is performed only in the direction from the terminal device DV to the host device HS.

The management unit 4a manages operation data DA1 stored in the storage unit 4b. As illustrated in FIG. 4, the management unit 4a physically has a CPU 4a1, a RAM 4a2, and a ROM 4a3. The CPU 4a1, the RAM 4a2, and the ROM 4a3 are connected to a bus BUS together with the storage unit 4b. The CPU 4a1 generally controls the connection device by loading a predetermined computer program stored in a built-in memory such as the RUM 4a3 into the RAM 4a2 (particularly, a program for executing a part performed by the connection device 1 in the sequence illustrated in FIG. 6) and executing the loaded computer program. The communication unit 4a4 has an interface for communicating with the host device HS if the connection device 1 is connected to the host device HS.

The storage unit 4b is an electrically erasable programmable read-only memory (EEPROM) or the like from and to which data can be freely read and written, and stores operation data DA1, ID data DA2, and collation data DA3. The operation data DA1 indicates the operation content of the connection device 1. The operation data DA1 includes, for example, data indicating a communication standard serving as operation content and data indicating an electric power supply standard serving as operation content. The communication standard defines communication speeds in the communication line 3a and the communication line 3b. The electric power supply standard defines a voltage value and an electric current value in the electric power supply line 3c. If the connection device 1 is connected to the host device HS and the terminal device DV, communication via two communication lines 3a and two communication lines 3b and electric power supply via one electric power supply line 3c are implemented between the host device HS and the terminal device DV on the basis of the operation content indicated by the operation data DA1.

Figure 5:
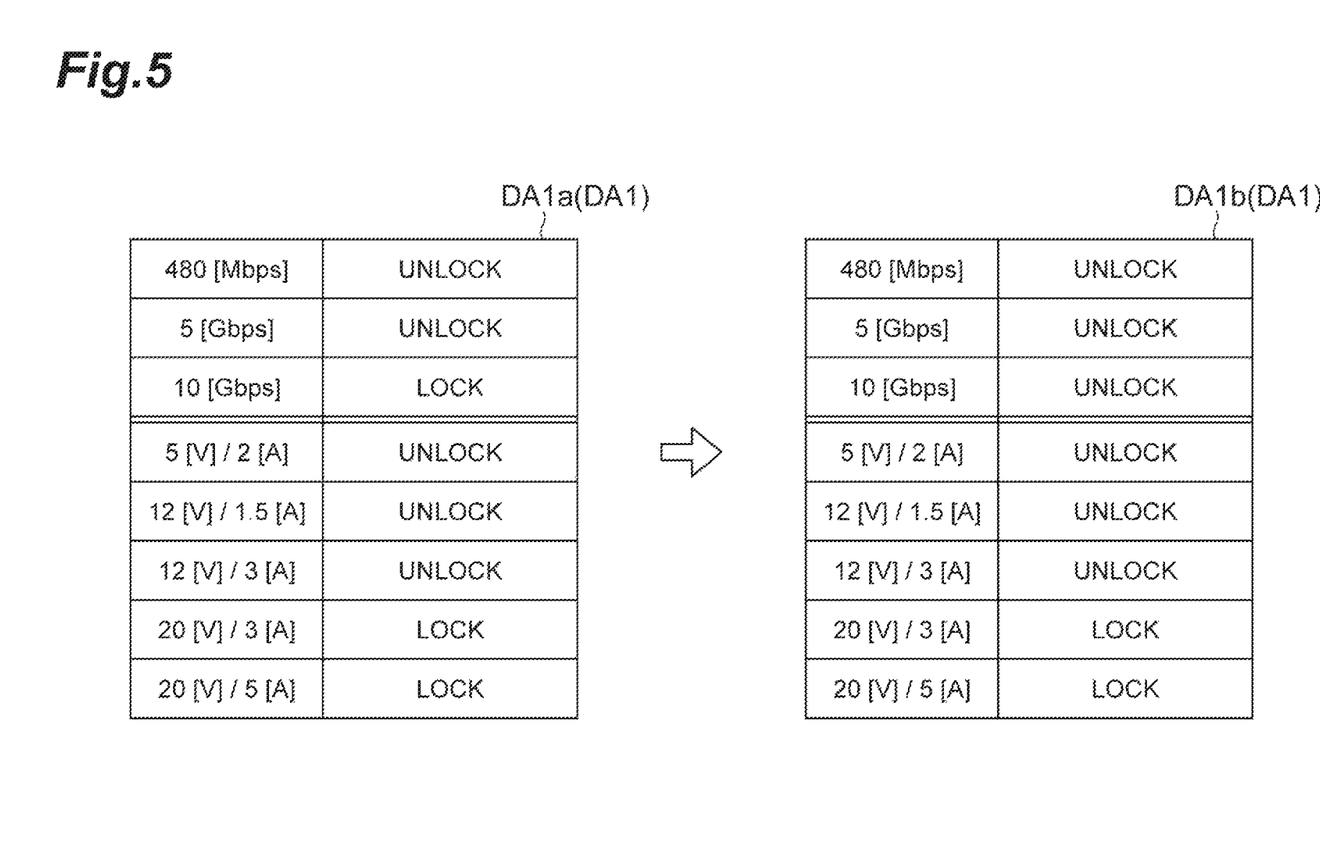
FIG. 5 is a diagram illustrating a specific example of operation data stored in the connection device according to an exemplary embodiment.

The operation data DA1 is, for example, operation data DA1a, operation data DA1b, or the like illustrated in FIG. 5, and the connection device 1 operates on the basis of the operation data DAL The communication standard (communication speed) shown in the operation data DA1 is, for example, 480 [Mbps], 5 [Gbps], 10 [Gbps], or the like as shown in the operation data DA1a and the operation data DA1b. The electric power supply standard (voltage value/electric current value) shown in the operation data DA1 is, for example, 5 [V]/2 [A], 12 [V]/1.5 [A], 12 [V]/3 [A], 20 [V]/3 [A], 20 [V]/5 [A], or the like as shown in the operation data DA1a and the operation data DA1b. As shown in the operation data DA1a and the operation data DA1b, an "UNLOCK" state or "LOCK" state is set for each of the plurality of communication speeds and each of the plurality of voltage values/electric current values. "UNLOCK" indicates that use at a current point in time in the connection device 1 is possible, and "LOCK" indicates that use at a current point in time in the connection device 1 is not possible. Also, the operation data DA1 may have data indicating another standard serving as the operation content of the connection device 1 (for example, 8.1 Gbps in a DisplayPort standard, 20 Gbps in a ThunderBolt 3 (ThunderBolt: registered trademark) standard, and the like, can be provided and standards such as peripheral component interconnect (PCI) Express (PCI Express: registered trademark), a high-definition multimedia interface (HDMI) (HDMI: registered trademark), and a serial digital interface (SDI) can be further superimposed).

The ID data DA2 is data for identifying the connection device 1, and is indicated by, for example, numerals, symbols, and the like. The collation data DA3 is data used to determine whether or not to respond to an instruction for changing the operation data DA1 transmitted from the host device HS and is used for improving the security of the connection device 1.

If the connection device 1 is connected to the host device HS via the connector unit 2a and the connection device 1 is connected to the terminal device DV via the connector unit 2b, the management unit 4a changes the operation data DA1 on the basis of the instruction data DA4 when the management unit 4a receives instruction data for issuing an instruction for changing the operation data DA1 (instruction data DA4 illustrated in FIG. 6) from the host device HS. The instruction data DA4 includes authentication data DA4a and change data. DA4b (see FIG. 6). The authentication data DA4a is used for authentication of a change in the operation data DA1. The change data DA4b indicates the changed content of the operation data DA1. For example, if the change in the operation data DA1 indicated by the instruction data DA4 corresponds to a change from the operation data DA1a to the operation data DA1b illustrated in FIG. 5, the change data DA4b included in the instruction data DA4 is the operation data DA1b.

The collation data DA3 is used for collation of the authentication data DA4a included in the instruction data DA4 transmitted from the host device HS. If the connection device 1 is connected to the host device HS and the terminal device DV, the management unit 4a collates the authentication data DA4a included in the instruction data DA4 with the collation data DA3 when the management unit 4a receives the instruction data DA4 from the host device HS, and changes the operation data DA1, for example, from the operation data DA1a illustrated in FIG. 5 to the operation data DA1b, on the basis of the change data DA4b included in the instruction data DA4 if the management unit 4a confirms validity of the authentication indicated by the authentication data DA4a as a result of this collation.

Figure 6:
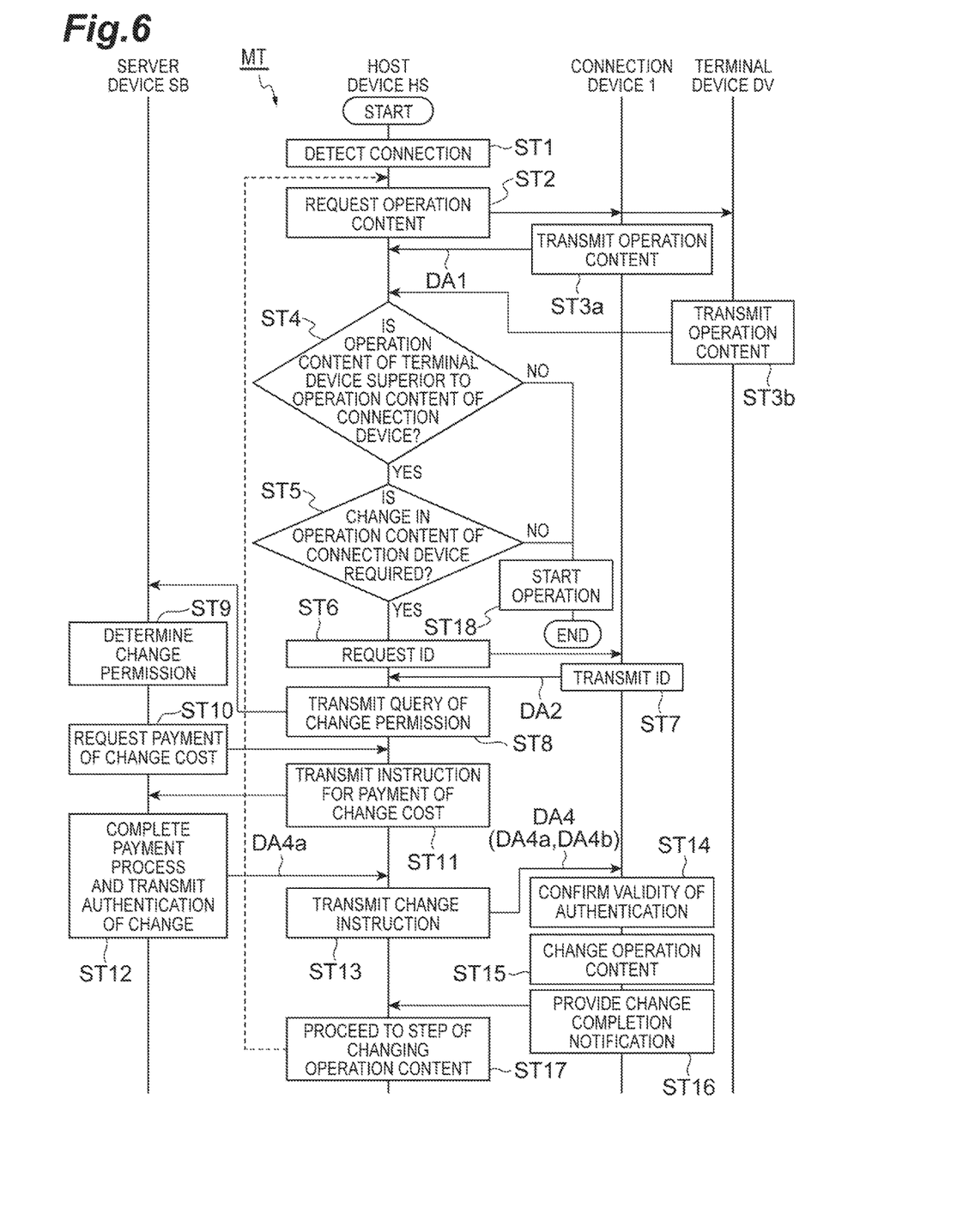
FIG. 6 is a sequence illustrating an example of a method of changing the operation content of the connection device according to an exemplary embodiment.

Next, a method according to one exemplary embodiment (a method of changing the operation content of the connection device) will be described with reference to FIG. 6. FIG. 6 is a sequence illustrating an example of a method of changing the operation content of the connection device (a method MT) according to the exemplary embodiment. First, the host device HS detects a connection between the connection device 1 connected to the terminal device DV and the host device HS (step ST1). In step ST1, the host device HS detects that the terminal device DV is connected to the connection device 1 by receiving a signal transmitted from the terminal device DV via the connection device 1.

Following step ST1, the host device HS requests the connection device 1 to provide current operation content of the connection device 1 and requests the terminal device DV to provide current operation content of the terminal device DV (step ST2). Following step ST2, the management unit 4a of the connection device 1 transmits operation data DA1 indicating the current operation content of the connection device 1 to the host device HS (step ST3a), and the terminal device DV also transmits the current operation content of the terminal device DV (content corresponding to the operation data DA1) to the host device HS (step ST3b). Also, the execution order of steps ST3a and ST3b is arbitrary.

Following step ST3a and step ST3b, the host device HS determines whether or not the current operation content of the terminal device DV is superior to the current operation content of the connection device 1 on the basis of the current operation content of the connection device 1 (operation data DA1) transmitted from the management unit 4a of the connection device 1 in step ST3a and the current operation content of the terminal device DV transmitted from the terminal device DV in step ST3b (step ST4). For example, if the operation content of the connection device 1 at a current point in time (operation data DA1) is the operation data DA1a illustrated in FIG. 5 and the operation content of the terminal device DV at a current point in time is usable (UNLOCK) up to a communication speed of 10 [Gbps], the operation content of the terminal device DV is superior to the operation content of the connection device 1 in terms of the communication standard. Also, if the operation content of the connection device 1 at a current point in time (operation data DA1) is operation data DA1a illustrated in FIG. 5 and the operation content of the terminal device DV at a current point in time is usable (UNLOCK) up to the communication speed of 5 [Gbps], the operation content of the terminal device DV and the operation content of the connection device 1 are equivalent in terms of the communication standard. Also, in terms of the electric power supply standard, a determination of whether or not the operation content of the terminal device DV is superior to the operation content of the connection device 1 is made as in an example of the case of the above-mentioned communication standard. If the operation content of the terminal device DV is superior to the operation content of the connection device 1 in terms of at least one of the communication standard and the electric power supply standard, the host device HS determines that the operation content of the terminal device DV is superior to the operation content of the connection device 1 (step ST4: YES).

If the host device HS determines that the operation content of the terminal device DV is superior to the operation content of the connection device 1 in step ST4 (step ST4: YES), the host device HS determines whether or not a change in the operation content of the connection device 1 is necessary (step ST5). For example, in step ST5, the host device HS displays the current operation content of the terminal device DV and the current operation content of the connection device 1 on the display device (display) of the host device HS, displays that an operation is performed in the operation content of the connection device 1 at the current point in time (that an operation is not performed in the operation content of the terminal device DV superior to the operation content of the connection device 1 at the current point in time) on the display device of the host device HS, and further displays that the connection device 1 can be operated in the operation content of the terminal device DV superior to the operation content of the connection device 1 at the current point in time by changing the operation content of the connection device 1 to the operation content of the terminal device DV superior to the operation content of the connection device 1 at the current point in time on the display device of the host device HS, thereby transmitting a query of whether or not to change the current operation content of the connection device 1 to the operation content of the terminal device DV to the user. If an instruction input indicating that the current operation content of the connection device 1 is to be changed to the operation content of the terminal device DV is issued to the host device HS in step ST5, the host device HS determines that a change in the operation content of the connection device 1 is necessary (step ST5: YES), and the process proceeds to step ST6. If an instruction input indicating that the current operation content of the connection device 1 is not to be changed to the operation content of the terminal device DV is issued to the host device HS in step ST5, the host device HS determines that a change in the operation content of the connection device 1 is not necessary (Step ST5: NO) and starts communication with the terminal device DV via the connection device 1 on the basis of the current operation data DA1 of the connection device 1 (step ST18). Although the operation content of the host device HS is assumed to be the same as or superior to the operation content of the connection device 1 in the present exemplary embodiment, the operation content of the connection device 1 may be superior to the operation content of the host device HS. Even when the operation content of the connection device 1 is superior to the operation content of the host device HS as described above, the host device HS determines "NO" in step ST5.

Following Step ST5: YES, the host device HS requests the connection device 1 to provide ID data DA2 of the connection device 1 (step ST6). Following step ST6, the management unit 4a of the connection device 1 reads the ID data DA2 from the storage unit 4b and transmits the ID data DA2 to the host device HS (step ST7).

Following step ST7, when the host device HS receives the ID data DA2 from the connection device 1, the host device HS transmits the ID data DA2, the current operation data DA1 of the connection device 1 (for example, operation data DA1a illustrated in FIG. 5), and operation data indicating the changed operation content of the connection device 1 (operation content of the terminal device DV) (for example, operation data DA1b illustrated in FIG. 5) to the server device SB, and transmits a query for permitting a change in the operation data DA1 of the connection device 1 to the server device SB (step ST8). That is, in step ST8, if the host device HS determines that the operation content of the terminal device DV is superior to the operation content of the connection device 1 (step ST4: YES), the host device HS transmits the query for permitting the change in the operation data DA1 indicating the operation content of the connection device 1 to the server device SB that manages the usage state of the connection device 1 after the host device HS acquires the ID data DA2 of the connection device 1 from the connection device 1 in response to the request transmitted by the host device HS to the connection device 1 in step ST6 in order to adjust the operation content of the connection device 1 to the operation content of the terminal device DV in accordance with the determination in step ST5: YES (a determination indicating that a change in the operation data DA1 of the connection device 1 is necessary) (step ST8).

Following step ST8, the server device SB determines permission for changing the operation data DA1 (step ST9). In step ST9, the server device SB compares the ID data DA2 of the connection device 1 sent from the host device HS and the operation data DA1 indicating the current operation content of the connection device 1 (for example, the operation data DA1a illustrated in FIG. 5) with the ID data stored in the server device SB and the operation data related to the ID data and permits the connection device 1 to change the operation data DA1 indicating the current operation content of the connection device 1 (the operation data DA1 currently stored in the storage unit 4b) if the ID data and the operation data match.

Following step ST9, the server device SB requests the host device HS to pay a fee necessary for permitting a change in the operation data DA1 (step ST10). Following step ST10, the host device HS displays the request for payment of the fee necessary for changing the operation data DA1 on the display device of the host device HS and prompts the user to pay the fee (step ST11). In step ST11, when a fee payment instruction (for example, data related to a credit card and a payment instruction) is input from the user, the host device HS transmits the payment instruction to the server device SB.

Following step ST11, the server device SB completes a fee payment process necessary for change and transmits authentication data DA4a indicating change authentication to the host device HS (step ST12). In step ST12, if the server device SB permits the change in the operation data DA1 of the connection device 1 (if the fee payment process necessary for the change is completed), the server device SB transmits the authentication data DA4a used for authentication of the change of the operation data DA1 to the host device HS. Further, in step ST12, if the server device SB permits the change in the operation data DA1, the server device SB rewrites the operation data DA1 of the connection device 1 stored (registered) in the server device SB side in association with the ID data DA2 of the connection device 1 (for example, operation data DA1a illustrated in FIG. 5) with operation data indicating the changed operation content of the connection device 1 (operation content of the terminal device DV) (for example, operation data DA1*b* illustrated in FIG. 5).

Following step ST12, the host device HS that receives the authentication data DA4*a* from the server device SB transmits the instruction data DA4 including the change data DA4*b* indicating the changed content of the operation data DA1 of the connection device 1 (operation data indicating the changed operation content of the connection device 1 (operation content of the terminal device DV) (for example, the operation data DA1*b* illustrated in FIG. 5)) and the authentication data DA4*a* transmitted from the server device SB to the connection device 1 (step ST13).

Following step ST13, when the connection device 1 receives the instruction data DA4 from the host device HS, the connection device 1 changes the operation data DA1, for example, from the operation data DA1*a* illustrated in FIG. 5 to the operation data DA1*b*, on the basis of content of the change data DA4*b* included in the instruction data DA4 (for example, operation data DA1*b* illustrated in FIG. 5) (step ST15) after the connection device 1 confirms validity of the authentication indicated by the authentication data. DA4*a* included in the instruction data DA4 using the collation data DA3 (step ST14). Following step ST15, the management unit 4*a* of the connection device 1 notifies the host device HS of the completion of the change in the operation data DA1 (step ST16). When the host device HS receives a change completion notification from the connection device 1, the host device HS proceeds to step ST2 for requesting the connection device 1 and the terminal device DV to provide the operation content (step ST17). On the basis of the current operation data DA1 of the connection device 1 (the changed operation data DA1 in ST15) and the operation data of the terminal device DV obtained by execution of step ST2 following step ST17, the host device HS executes step ST4, determines that the operation content of the terminal device DV is equivalent to the operation content of the connection device 1 (step ST4: NO), and starts communication with the terminal device DV via the connection device 1 (step ST18).

If the server device SB determines that the operation data (for example, the operation data DA1*b* illustrated in FIG. 5) indicating the changed operation content of the connection device 1 (the operation content of the terminal device DV) is already registered on the server device SB side in step ST9, the server device SB can transmit the authentication data DA4*a* to the host device HS without executing step ST10 and step ST12 after step ST9. As a situation in which this case is possible, for example, there is a case in which the processing of step ST10 has already been executed and a subsequent process is suspended due to communication problems or the like after the operation data DA1 in the host device HS is rewritten with (registered in) changed operation data (for example, the operation data DA1*b* illustrated in FIG. 5) in step ST12, a case in which the user of the connection device 1 has already performed a process of changing the operation data DA1 on the server device SB without the host device HS, or the like.

Also, in step ST12, the server device SB can merely transmit permission data indicating change permission to the host device HS without transmitting the authentication data DA4*a* to the host device HS. In this case, the host device HS transmits the permission data to the connection device 1, and the management unit 4*a* of the connection device 1 executes step ST15 (the step of changing the operation content) without executing step ST14 (the step of confirming validity of authentication). As a situation in which this case is possible, there is a case in which communication security between the connection device 1, the host device HS, and the server device SB is sufficiently high, or the like.

Although the principles of the present disclosure have been illustrated and described in a preferred exemplary embodiment, it should be apparent to those skilled in the art that the disclosure can be modified in arrangement and detail without departing from such principles. The present disclosure is not limited to a specific configuration disclosed in the present exemplary embodiment. The present disclosure claims all modifications coming within the spirit and scope of the following claims.

For example, as illustrated in FIG. 7, the main body 2*a*1 of the connector unit 2*a* may include at least one of a signal conditioner 2*a*13 and a power conditioner 2*a*14.

The signal conditioner 2*a*13 is provided on the two communication lines 3*a* and the two communication lines 3*b*, and implements communication via two communication lines 3*a* and two communication lines 3*b* in a communication standard indicated by the operation data DA1. The signal conditioner 2*a*13 includes a circuit for correcting at least one of the amplitude distortion of the signal and the distortion of the signal. In the signal conditioner 2*a*13, a plurality of correction circuits corresponding to communication standards (a correction circuit corresponding to a communication standard of 480 [Mbps], a correction circuit corresponding to a communication standard of 5 [Gbps], and a correction circuit corresponding to a communication standard of 10 [Gbps]) are connected in series. The management unit 4*a* instructs the signal conditioner 2*a*13 to set the communication standard shown in the operation data DAL Specifically, the management unit 4*a* instructs the signal conditioner 2*a*13 to turn on/off a plurality of correction circuits according to the communication standard (communication speed). In the correction circuit instructed to be turned on, the input signal is output after being corrected. In the correction circuit instructed to be turned off, the input signal is output without change as it is. Also, the management unit 4*a* can instruct the signal conditioner 2*a*13 to stop all of the plurality of correction circuits. When all of the plurality of correction circuits are stopped, the signal input to the signal conditioner 2*a*13 is not output from the signal conditioner 2*a*13.

Also, the power conditioner 2*a*14 is provided in one electric power supply line 3*c* and realizes electric power supply via one electric power supply line 3*c* in the electric power supply standard shown in the operation data DA1. The power conditioner 2*a*14 includes a circuit (voltage converter) for correcting the voltage supplied via the electric power supply line 3*c*. In the power conditioner 2*a*14, a plurality of voltage converters according to electric power supply standards (a voltage converter corresponding to an electric power supply standard of 5 [V], a voltage converter corresponding to an electric power supply standard of 12 [V], and a voltage converter corresponding to an electric power supply standard of 20 [V]) are connected in series. The management unit 4*a* instructs the power conditioner 2*a*14 to set the electric power supply standard shown in the operation data DA1. Specifically, the management unit 4*a* instructs the power conditioner 2*a*14 to turn on/off the plurality of voltage converters according to the electric power supply standard (voltage). In the voltage converter instructed to be turned on, the applied voltage is output after being corrected. In the voltage converter instructed to be turned off, the applied voltage is output without change as it is. The management unit 4*a* can instruct the power conditioner 2*a*14 to stop all of the plurality of voltage converters. If all of the plurality of voltage converters are stopped, the voltage applied to the power conditioner 2a14 is not output from the power conditioner 2a14.

Although various exemplary embodiments have been described above, various modified aspect may be configured without being limited to the above-described exemplary embodiments.

From the foregoing description, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connection device comprising:
a cable unit;
a first connector unit:
a second connector unit; and
a circuit board,
wherein the first connector unit is provided at a first end of the cable unit and is connectable to a host device,
wherein the second connector unit is provided at a second end of the cable unit and is connectable to a terminal device,
wherein the circuit board includes a control unit and is provided in one of the first connector unit and the second connector unit,
wherein the control unit includes a storage unit and a management unit;
wherein the storage unit stores operation data indicating operation content of the connection device,
wherein the management unit manages the operation data,
wherein the management unit changes the operation data on the basis of instruction data when the management unit receives the instruction data for issuing an instruction for changing the operation data from the host device if the connection device is connected to the host device via the first connector unit and the connection device is connected to the terminal device via the second connector unit,
wherein the instruction data includes authentication data and change data,
wherein the authentication data is used for authentication of a change in the operation data,
wherein the change data indicates changed content of the operation data,
wherein the storage unit stores collation data,
wherein the collation data is used for collation of the authentication data, and
wherein, if the connection device is connected to the host device and the terminal device, the management unit collates the authentication data included in the instruction data with the collation data when the management unit receives the instruction data from the host device, and changes the operation data on the basis of content of change data included in the instruction data when the management unit confirms validity of the authentication indicated by the authentication data as a collation result.

2. The connection device according to claim 1, further comprising:
one or more communication lines; and
one or more electric power supply lines,
wherein the operation data has data indicating a communication standard and data indicating an electric power supply standard,
wherein the communication standard defines communication speeds in the one or more communication lines,
wherein the electric power supply standard defines voltage values and electric current values in the one or more electric power supply lines, and
wherein, if the connection device is connected to the host device and the terminal device, communication via the one or more communication lines and electric power supply via the one or more electric power supply lines are implemented between the host device and the terminal device on the basis of the operation content indicated by the operation data.

3. The connection device according to claim 2, further comprising:
a signal conditioner,
wherein the signal conditioner is provided in the communication lines and communication via the communication lines is implemented in the communication standard shown in the operation data, and
wherein the management unit instructs the signal conditioner to set the communication standard shown in the operation data.

4. The connection device according to claim 2, further comprising:
a power conditioner,
wherein the power conditioner is provided in the one or more electric power supply lines and electric power supply via the one or more electric power supply lines is implemented in the electric power supply standard shown in the operation data, and
wherein the management unit instructs the power conditioner to set the electric power supply standard shown in the operation data.

5. A method of changing operation content of a connection device which connects a host device and a terminal device, the method comprising the steps of:
detecting, by the host device, a connection between the connection device connected to the terminal device and the host device;
requesting, by the host device, the connection device to provide the operation content of the connection device and requesting, by the host device, the terminal device to provide operation content of the terminal device;
determining, by the host device, whether or not the operation content of the terminal device is superior to the operation content of the connection device;
transmitting, by the host device, a query for permitting a change in operation data indicating the operation content of the connection device to a server device which manages a usage state of the connection device in order to adjust the operation content of the connection device to the operation content of the terminal device if the host device determines that the operation content of the terminal device is superior to the operation content of the connection device;
transmitting, by the server device, authentication data used for authentication of a change in the operation data to the host device if the server device permits the change in the operation data of the connection device;
transmitting, by the host device receiving the authentication data, the authentication data and change data indicating changed content of the operation data to the connection device; and
changing the operation data on the basis of content of the change data after the connection device confirms validity of authentication indicated by the authentication data when the connection device receives the authentication data and the change data from the host device.

6. The method according to claim 5,
wherein the operation data has data indicating a communication standard and data indicating an electric power supply standard,
wherein the communication standard defines a communication speed in the connection device, and
wherein the electric power supply standard defines a voltage value and an electric current value in the connection device.

* * * * *